Feb. 10, 1959      D. S. BOREY      2,873,247
SINGLE VESSEL COKING PROCESS
Filed Sept. 21, 1953
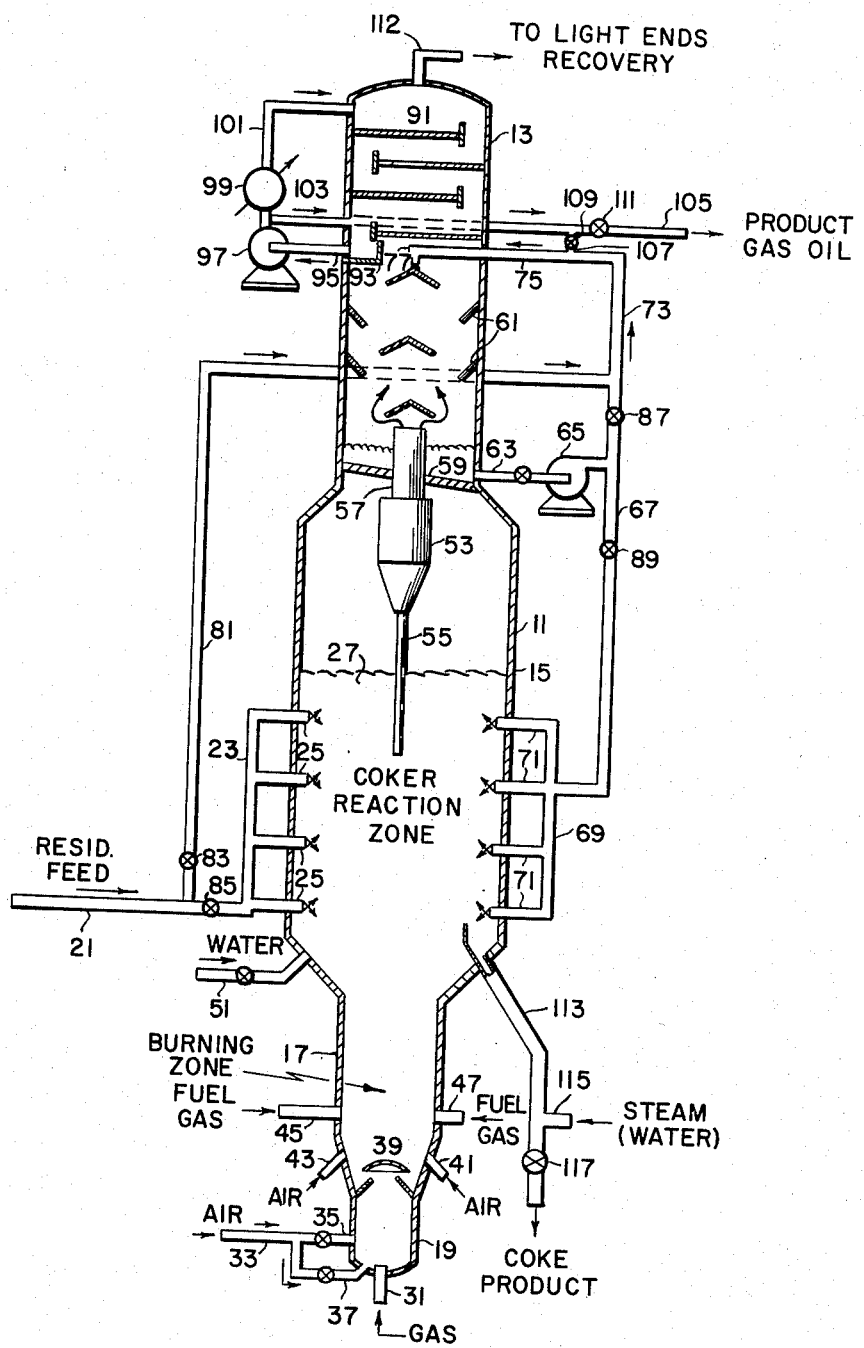
Daniel S. Borey    Inventor
By   Attorney

United States Patent Office 2,873,247
Patented Feb. 10, 1959

2,873,247

SINGLE VESSEL COKING PROCESS

Daniel S. Borey, Cranford, N. J., assignor to Esso Research and Engineering Company, a corporation of Delaware Application September 21, 1953, Serial No. 381,173

3 Claims. (Cl. 208—95)

The present invention relates to a single vessel coking process. More particularly, it relates to a process for the conversion of petroleum oils, particularly heavy residual oils, to more valuable products, in a single vessel or essentially a single vessel system. The invention involves the use of fluidized particulate solids in contiguous zones in a single and continuous system, wherein heat of combustion in a lower zone and the gaseous products thereof are employed to carry out the conversion in the contiguous superimposed zone.

It has previously been proposed to coke residual or heavy hydrocarbon oils by the fluid bed process. As compared with other fluid bed processes, the coking of such oils requires the use of relatively coarse solids in the bed to minimize agglomeration.

The prior art has also suggested the use of a single vessel for carrying out two or more related operations in more or less contiguous zones. The present invention, however, is distinguished in its novel arrangement and also in the sequence of the process steps carried out therein. It has reasonably clean separation between burning zone and coking zone because fluidizing gas rates are controlled by vessel design, to impede free intermixing of the two zones, although they are contiguous. The invention involves a number of other advantages over prior art systems and procedures. Among these advantages the following are some of the more important:

(1) Elimination of transfer lines for particulate solids. This is particularly advantageous in fluid coking where, for proper vessel operation, a relatively coarse coke is used which makes flow through transfer lines a troublesome operation. A desirable particle size range for coking passes little or none of the solids through a 200 mesh screen (approx. 70 microns) and passes around 30 to 50% of the material through a 60 mesh screen (approx. 250 microns). For fluidizing particles of this size range, a fluidizing gas velocity considerably higher than used, for example, in catalytic cracking may be required and the present invention makes efficient use of the available gases.

(2) Elimination of reactor fluidizing steam. Prior art types of fluid bed coker reactors requires substantial quantities of steam to maintain the reaction bed in a fluid state. Since the use of steam for this purpose is expensive, commercial designs are limited to fluidizing steam rates less than that which has been found optimum in pilot plant operation. In the present invention the waste flue gases provided by the combustion of air furnish enough fluidization gas to insure trouble-free and efficient reaction. The use of air, rather than more concentrated forms of oxygen, enhances this effect.

(3) Low cost. Combining the fluid burner and the reaction bed in the same vessel greatly simplifies plant construction and operability.

(4) Simpler reactor shape. The use of substantial quantities of flue gas for reactor fluidization permits the design of a relatively simple and inexpensive vessel, since economy in vessel construction rather than steam economy may be given consideration. In some conventional designs the reactor must necessarily be conical in shape, tapering to a small diameter at the bottom, so that the lower zone of the cone where fluidizing steam and but little reactant vapors are present will operate at steam velocities sufficiently high to promote proper fluidization. Such a conical reactor is expensive to build, and for a given holdup, may be several times as tall as the straight side design of the present invention.

(5) Lower air blower discharge pressure. The generally cylindrical and relatively shallow bed reactor described above requires substantially lower air blower discharge pressures than a vessel design using a long tapering reactor which is designed primarily for steam economy.

(6) Improved product withdrawal system. Injection of water into the bottom of the coke withdrawal line serves not only to cool the coke and the resultant vapors effectively, but serves also to strip hydrocarbon vapors from the product coke, all without substantial and undesirable heat removal from the reaction zone. It contributes also to bed fluidization.

(7) Lower reactor oil partial pressure. The presence of substantial quantities of flue gas lowers the reactor oil partial pressure and therefore facilitates vaporization of heavy gas oil fractions in the feed which is a desirable feature hitherto impossible to achieve in conventional designs.

(8) Improved heat utilization. Combustion products leave the system at reaction temperature rather than at a higher temperature that would be the case with the flue gases from a conventional separate burning vessel.

The foregoing advantages will be more clearly understood and the objects of the invention will become more readily apparent as a detailed description of an embodiment of the invention proceeds.

Therefore, reference will next be made to the attached drawing which forms part of the specification. In the single figure of drawing the essential features of the apparatus are all contained within a unitary vessel 11. This vessel has an upper generally cylindrical portion 13, a middle section of expanded cross-section, also preferably of cylindrical form, indicated at 15, and a bottom section of reduced cross-section indicated at 17. A small appendage at the bottom of section 17 is provided as an air line heater 19.

In operation, a suitable heavy oil feed such as residuum or reduced crude is introduced through line 21 into a multiple nozzle feeder line 23. As indicated, a series of spray nozzles 25 project from the manifold 23 into the intermediate or enlarged zone 15 or vessel 11.

As the coking reaction proceeds, as described more fully below, coke is formed in the section 15 and eventually a fluidized bed of coke particles is established as indicated at 27. Fluidization is maintained by combustion gases from the lower zone, to be described, and also from the products of the coking reaction.

The coked particles in the intermediate zone or bed 27 are relatively dense and the bed is but mildly fluidized because of its large cross-section and relatively low upward velocity of fluidizing gases passing through this bed. In the reduced section 17 below the intermediate section, however, the coke particles which tend to accumulate are more actively fluidized by hot gas introduced from the bottom and combustion gases produced within the burning zone 17. Hence, the coke particles in this zone tend to be relatively more disperse although this tendency is partially offset by the increased fluistatic pressure on the burning zone from the fluidized bed 27.

Fluidizing gas is preferably formed in an air line heater section 19 below the burning zone. Combustible gas is introduced through a line 31 and an oxidizing gas, preferably air, is introduced through a line 33. As shown, line 33 has two branches 35 and 37 controlled by valves so as to distribute the air in the heater 19 for the most efficient combustion of the gas introduced through line 31. This gas may be any suitable combustible gas such as the lower hydrocarbons, hydrogen, carbon monoxide, or mixtures thereof, including water gas and producer gas.

A baffle arrangement 39 is arranged above the air line heater to prevent coke particles from falling down into the gas and air jets 31, 35, etc. The hot combustion products from zone 19, however, pass upwardly into the burning zone and tend to fluidize the coke in the burning zone as well as in the coker reaction zone 27. By providing excess air in zone 19, these gases may assist in supplying heat to the burner zone by taking part in the combustion there.

Additional air inlets are provided as indicated at 41 and 43 at the bottom of the burning zone. In many cases, the value of the coke is sufficiently low that there is no objection to burning the coke itself to provide necessary heat for carrying out the coking reaction. In other cases, it may be desirable to obtain product coke for metallurgical and other uses. In such cases suitable fuel gases or low cost fuel oils, such as torch oil, may be introduced into the burning zone through lines 45 and 47. For this arrangement the extraneous fuel is burned, preferentially to the coke, and the combustion products as well as the products from zone 19, fluidize the coke particles in the burning zone very actively. The gas velocity in this zone should be between about three and seven or more feet per second in this zone. The result of such active fluidization is that the highly heated coke particles in the burning zone are strongly mixed into the relatively quiescent fluid bed 27 which is superimposed thereon. By this means thorough mixing and good heat transfer within the coker reaction zone are assured.

The velocity of the combined fluidizing gases within the coker reaction zone preferably should be substantially lower than velocities within the burning zone, as previously suggested. Thus, a superficial gas velocity of about 0.5 to about 5 feet per second is desirable in the coking zone. Specifically preferred velocities are about 1 to 3 feet per second at the bottom of the reaction zone 27, increasing to about 3 feet per second at the top or interface of the bed 27. In order to control the gas velocities more accurately in bed 27 it may be desirable to introduce additional fluidizing gas or vapor. This may be done by introducing water through one or more lines 51 near the bottom of the coking zone. This also will establish temperature control over the coke particles and the conversion of the water to steam, by contacting with the hot coke particles, is a thermally efficient way to produce the necessary steam.

The gases and vapors produced in the coking reaction pass upwardly through a solids-gas separator in the form of a cyclone 53. This cyclone is provided with a solids return line 55 which extends into bed 27. The cyclone has a large outlet for the gasiform products indicated at 57. This passes through a partition 59 which, except for the opening 57, completely separates the coking zone from the cylindrical zone 13 above.

The gasiform products emerging through line 57 are scrubbed of entrained liquid by passing them through a baffle zone, the baffling arrangement being preferably of the conventional disc and doughnut type as indicated at 61. The accumulated liquid from the scrubbing stays on the partition 59 which preferably slopes to one side to facilitate their occlusion or withdrawal from the system through a valved line 63 and a pump 65.

From pump 65 the liquid products may either be recycled to the bed through a line 67, manifold 69 and spray nozzles 71, or it may be pumped upwardly through a line 73 and line 75 to a nozzle 77 in the scrubbing zone. In the latter case the liquid is sprayed into the scrubber countercurrently to the upflowing gaseous products from the coker zone. This removes the entrained liquid more completely than the simple baffling arrangement.

If desired, a part of the original feed, which is preferably preheated to a temperature of 300 to 600° F. or more, may also be sprayed through nozzle 77. For this purpose, a line 81 is provided from line 21 to connect with line 73 as shown. Control valves 83 and 85 are provided for controlling a division of the feed and control valves 87 and 89 are provided respectively in lines 73 and 67 for division of the recycled liquid from pump 65.

The scrubbed gases and vapors from the scrubbing zone pass upwardly through a fractionator which is located in the upper part of the top section 13 of the vessel. This distillation apparatus may preferably comprise a series of fractionating plates 91. The heaviest liquid components are collected at the bottom, at 93, and drawn off through line 95 by a pump 97. From this pump they may be passed through a variable control valve 99 to line 101 which recycles them to the top fractionating plate. Otherwise part or all of the product gas oil drawn off by pump 97 is passed into the product line 103. From line 103 the product gas oil may be taken out at 105 or a part of it may be recycled through a connecting line 107 into line 75 and to spray nozzle 77 to assist in the scrubbing previously described.

Control valves 109 and 111 are provided in lines 105 and 107 for proper control and division of the gas oil stream. The products boiling below the gas oil range may be taken out of the system through a line 112 to a suitable light ends recovery system. Ordinarily it is not practicable to fractionate completely within section 13 of the vessel although additional liquid cuts may be taken if desired.

In the coker reaction zone there is ordinarily some accumulation of coke product and this is particularly true when extraneous fuel is burned in the burning zone to supply the reaction heat requirements. Even when coke is burned to supply heat requirements there is usually some net coke production. Hence, the product coke is withdrawn through a drawoff line 113 which also constitutes a stripper. In order to strip the vaporous coker products from the effluent coke a suitable stripping gas such as steam is introduced through a line 115. In practice, it has been found preferable to introduce water into this line so that steam is formed upon counterflow contact with the descending coke stream. The steam, of course, flows upwardly and strips the hydrocarbon gases and vapors from the coke. At the same time it cools the coke substantially so that it can be handled and will not ignite spontaneously upon release from the coker vessel. A control valve 117 is provided to regulate the rate of coke withdrawal.

It will be understood that control valves, not shown, may be provided for the various gas and air lines such as 31, 41, 43, 45 and 47 wherein such valves are not indicated. Likewise the number of nozzles 25 or 71 and their arrangement may be varied to suit requirements.

The design of the coking vessel is such that a high fluidizing gas velocity is attained in the burning zone, a minimum velocity that is suitable is obtained in the bottom of the reactor zone, and the gas velocity increases toward the top of the reactor zone.

By using a high fluidizing gas velocity in a burning zone, e. g., of relatively small cross-section, and by passing the gases from this zone directly through the superimposed coker reaction zone at a substantially reduced velocity, good mixing of the hot particles from the burning zone into the coking zone is assured without excessive elutriation of coke particles out of the coker reaction zone. The high upflow velocities used in the burner section also prevent the backmixing of substantial portions of the reactor product vapors into the burner thus minimizing the combustion of vapor product and maximizing the combustion of coke and/or extraneous low value fuel. The heat transfer is efficient and the various advantages outlined above are thereby achieved.

It will be understood that various modifications may be made as will be apparent to those skilled in the art without departing from the spirit and purpose of the invention.

What is claimed is:

1. The process of converting hydrocarbon oils to produce lower boiling products, which comprises establishing a mass of coke particles in a reaction zone of reduced cross-section at the bottom and larger cross-section in a region above the bottom, said reduced and enlarged cross-sections being in open field communication with each other, introducing air into the coke particles in the bottom region at a velocity in the range of about 3 to 7 ft./sec. to fluidize the portion of reduced cross-section vigorously, to heat said coke substantially and cause it to fluidize less vigorously in the larger cross-sectional portion, introducing the hydrocarbon oil feed directly into the less vigorously fluidized upper portion of the mass, to convert said feed to lower boiling products and coke, withdrawing the product coke from the less actively fluidized zone, introducing a stream of water countercurrently to the withdrawn coke to cool said coke and to form a stream of stripping steam for stripping hydrocarbon vapors from the withdrawn coke, and injecting the stripping steam and stripped hydrocarbon vapors into the less actively fluidized bed to provide additional fluidizing vapors.

2. Process according to claim 1 wherein the heat producing gas comprises air plus combustible hydrocarbon to reduce combustion of the coke.

3. In the process for coking residual hydrocarbon oils, wherein the operations of combustion, coking, scrubbing and fractionating are carried out in vertical succession in a single vessel, the improvement which comprises forming in a section of the vessel of expanded cross-section, a relatively dense fluid bed of mildly fluidized coke particles superimposed in open fluid communication on a relatively sparse fluidized bed of more actively fluidized coke particles formed in a lower section of reduced cross-section, introducing air and fuel gases into said sparse bed in sufficient amounts to maintain an upwardly moving, fluidizing gas velocity in the range of 3 to 7 ft./sec., passing gaseous combustion products from said sparse bed upwardly through the mildly fluidized bed, preheating the residual oil to be converted and feeding it directly into the mildly fluidized bed to convert it to coke and vaporous hydrocarbons of relatively low boiling point, withdrawing product coke from said mildly fluidized bed, and introducing a stream of steam countercurrent to the withdrawn coke.

References Cited in the file of this patent

UNITED STATES PATENTS

| | | |
|---|---|---|
| 2,433,726 | Angell | Dec. 30, 1947 |
| 2,436,160 | Blanding | Feb. 17, 1948 |
| 2,445,328 | Keith | July 20, 1948 |
| 2,453,592 | Putney | Nov. 9, 1948 |
| 2,485,315 | Rex et al. | Oct. 18, 1949 |
| 2,623,010 | Schutte | Dec. 23, 1952 |
| 2,780,586 | Mader | Feb. 5, 1957 |